United States Patent
Kono et al.

Patent Number: 5,132,599
Date of Patent: Jul. 21, 1992

[54] VELOCITY CONTROL APPARATUS

[75] Inventors: Shinichi Kono; Hironobu Takahashi, both of Oshino, Japan

[73] Assignee: Fanuc Limited, Minamitsuru, Japan

[21] Appl. No.: 415,240

[22] PCT Filed: Jan. 27, 1989

[86] PCT No.: PCT/JP89/00083
§ 371 Date: Sep. 11, 1989
§ 102(e) Date: Sep. 11, 1989

[87] PCT Pub. No.: WO89/07364
PCT Pub. Date: Aug. 10, 1989

[30] Foreign Application Priority Data

Jan. 29, 1988 [JP] Japan .................. 63-017441

[51] Int. Cl.$^5$ .................. H02P 5/40
[52] U.S. Cl. .................. 318/618; 318/611; 318/798; 318/808; 318/599
[58] Field of Search .................. 318/560–640, 318/800–829; 363/40, 41, 62, 63, 89, 112

[56] References Cited

U.S. PATENT DOCUMENTS

| | | | |
|---|---|---|---|
| 4,088,934 | 5/1978 | D'Atre et al. | 318/802 |
| 4,227,138 | 10/1980 | Espelage et al. | 318/807 X |
| 4,274,042 | 6/1981 | Walker et al. | 318/798 X |
| 4,295,081 | 10/1981 | Bigley et al. | 318/618 X |
| 4,314,190 | 2/1982 | Walker et al. | 318/808 X |
| 4,320,331 | 3/1982 | Plunkett | 318/808 X |
| 4,418,308 | 11/1983 | Bose | 318/808 X |
| 4,437,051 | 3/1984 | Muto et al. | 318/808 |
| 4,461,988 | 7/1984 | Plunkett | 318/805 X |
| 4,467,262 | 8/1984 | Curtiss | 318/811 |
| 4,611,158 | 9/1986 | Nagase et al. | 318/811 X |
| 4,639,854 | 1/1987 | Kurokawa et al. | 318/611 X |
| 4,823,066 | 4/1989 | Yoshiki et al. | 318/798 |
| 4,859,924 | 8/1989 | Chonan | 318/808 |
| 4,904,919 | 2/1990 | McNaughton | 318/798 |

*Primary Examiner*—Paul Ip
*Attorney, Agent, or Firm*—Staas & Halsey

[57] ABSTRACT

A velocity control apparatus in which velocity of a servomotor (12) is controlled by PWM-control of an inverter is so adapted that the gain (K′) of an amplifier section (11) in a current loop is held constant by detecting the power supply voltage of the inverter.

6 Claims, 3 Drawing Sheets

L: INDUCTANCE COMPONENT
R: RESISTANCE COMPONENT

VELOCITY CONTROL APPARATUS

BACKGROUND OF THE INVENTION a. Field of the Invention

This invention relates to a velocity control apparatus for controlling the velocity of a servomotor by PWM (pulse-width modulation) control of an inverter.

b. Description of the Related Art

In recent years, microprocessors have come to be widely used in velocity control apparatuses for controlling the driving of the servomotor. With a motor drive circuit composed of digital circuitry using a microprocessor, table information such as amplitude characteristics decided in conformity with motor characteristics is created, and the velocity of a servomotor is controlled by PWM control of an inverter based on a set velocity signal.

In a conventional velocity control apparatus of this kind, the range of fluctuation allowed with regard to power supply voltage is set to be within a prescribed limit. The apparatus is provided with a function which protects the motor from overcurrents when the aforementioned limit is exceeded, and with a protective function which shuts down the system automatically when the voltage is too low. However, no particular consideration is given to fluctuations within the prescribed limit.

More specifically, a fixed current loop constant K is provided. Therefore, when power supply voltage Vdc becomes high, current loop gain K′ ($=K \cdot Vdc/Pa$, where Pa represents carrier wave amplitude) rises in proportion to the voltage value and there is the danger that the motor current will oscillate. Conversely, when the power supply voltage becomes low, current loop gain diminishes and the response of the velocity loop to a commanded velocity signal slows down. The result is a deterioration in the quick response of the control system.

SUMMARY OF THE INVENTION

The present invention has been devised to solve the foregoing problems and its object is to provide a velocity control apparatus which makes stable velocity control possible by compensating for fluctuation in power supply voltage and obtaining a constant current loop gain.

In accordance with the present invention, there is provided a velocity control apparatus for controlling the drive current of a servomotor by a PWM-controlled inverter circuit, thereby controlling velocity of the servomotor, the apparatus includes a power supply of the inverter circuit, voltage detecting means for detecting an output voltage value of the power supply, and gain control means for holding constant a current loop gain based on the detected voltage value. Further, there is provided a PWM control device for PWM-controlling the inverter circuit used in the velocity control apparatus, the device includes constant computing means for computing a current loop constant inversely proportional to the power supply voltage of the inverter circuit, and signal generating means for forming a PWM control signal from the current loop constant and a command current value in such a manner that the current loop gain becomes constant.

Thus, in accordance with the present invention, when the servomotor is PWM-controlled, the power supply voltage is detected at all times and the current loop gain is held constant to enhance the stability of the control system. Further, in accordance the PWM control device of the invention, it is possible to construct a control system stabilized with respect to fluctuations in the power supply voltage.

DESCRIPTION OF THE PREFERRED EMBODIMENT

An embodiment of the present invention will now be described in detail with reference to the drawings.

Figure 2:
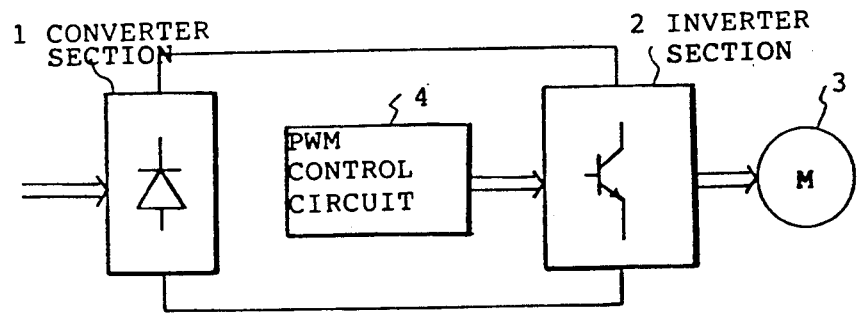
FIG. 2 is a view illustrating an example of the construction of a motor control system.

FIG. 2 is a view illustrating an example of the construction of a PWM-controlled motor control system. An inverter section 2 supplied with commercial AC voltage is connected to a converter section 1 as a DC power supply having a predetermined voltage value. The inverter section 2 is a transistorized inverter comprising a plurality of switching transistors and is for driving a three-phase AC motor 3. The inverter section 2 is connected to a PWM control circuit 4 and controls a current supplied to the primary side of the motor 3 in response to a PWM control signal applied to the base of each switching transistor from the PWM control circuit 4. The motor 3 can thus be controlled to vary its velocity.

Figure 3:
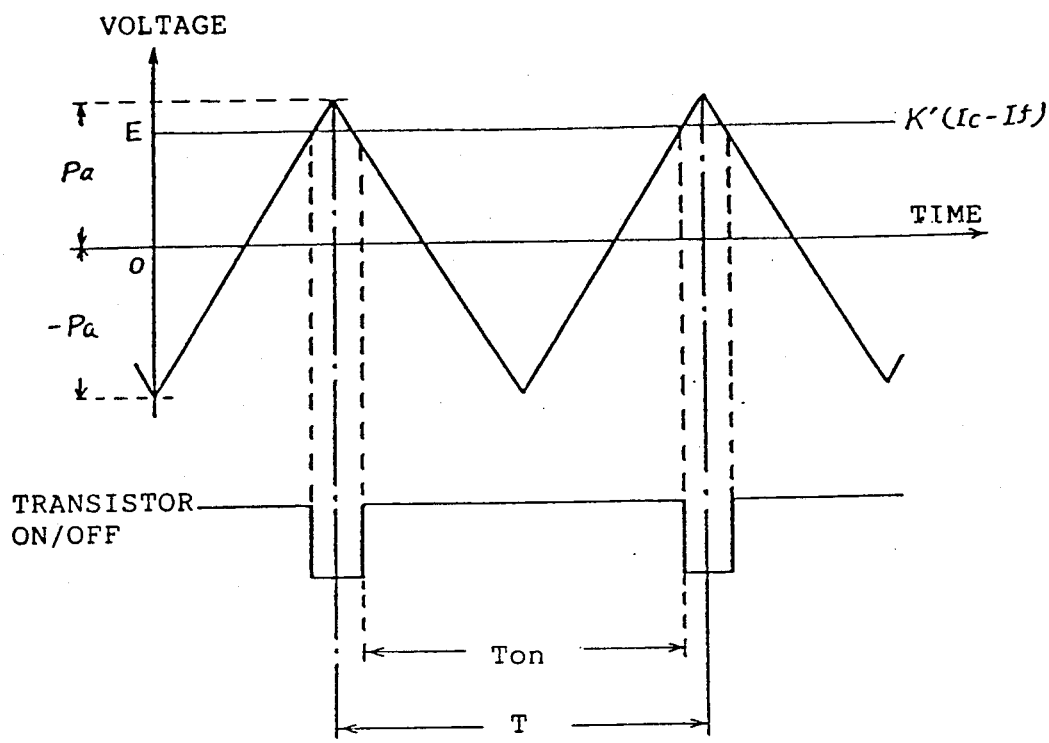
FIG. 3 is a time chart for describing PWM control.

FIG. 3 is a time chart for describing PWM control of the transistors in the inverter section 2 by means of the PWM control circuit 4. A triangular wave having a period of 2T is supplied as a carrier wave, and on time $T_{on}$ of the transistors in the inverter section 2 is decided by comparing the triangular wave with the level of a PWM command voltage E. Note that $\pm Pa$ represents the amplitude of the carrier wave.

Here the command voltage E is input as $K(Ic-If)$ with respect to a current loop constant K, and on time $T_{on}$ of the transistors, namely the value of drive current applied to the motor 3, is decided in dependence upon the magnitude of the command voltage E. The aforementioned Ic is a command current value decided by a torque command value, and If is a current feedback signal from the motor 3.

Figure 1:
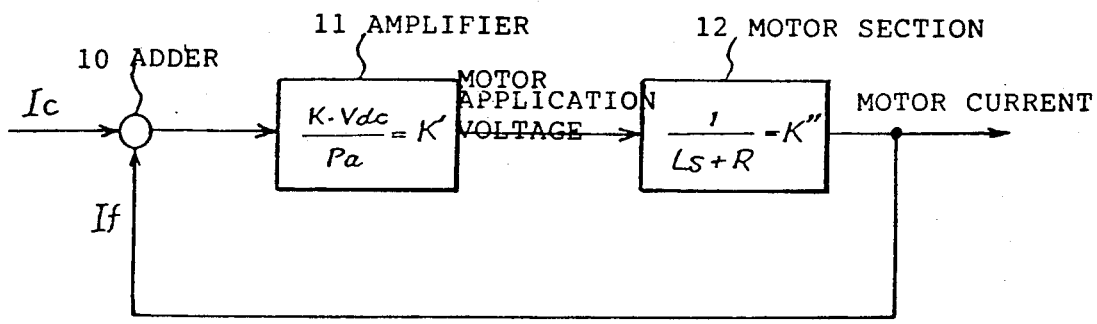
FIG. 1 is a block diagram illustrating an embodiment of the present invention.

FIG. 1 is a block diagram illustrating the current loop of the motor current controlled by the command current value $I_c$.

The command current Ic is compared with the current feedback signal IF from the motor 3 by an adder 10 which computes a error current. The value of the error current is output by a current feedback loop which includes an amplifier 11 having a current loop gain K′ capable of variably setting the current loop constant K, and a motor section 12 having an electrical constant K″. The current loop constant K is set in such a manner that the current loop gain K′ will be constant irrespective of a fluctuation in power supply voltage.

The current loop gain K′ in the current loop of FIG. 1 will now be described with reference to FIG. 4.

Figure 4:
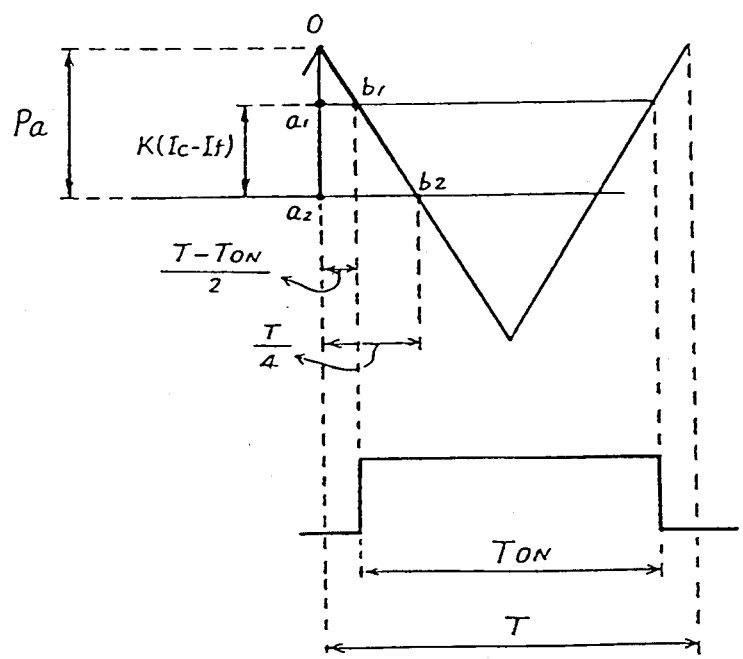
FIG. 4 is a view for describing computation with regard to current loop gain K′.

In FIG. 4, two triangles $\triangle oa_1b_1$, $\triangle oa_2b_2$ are similar since the three angles of one are equal to the three corresponding angles of the other. Therefore, the following equation holds:

$$\overline{a_1b_1}/\overline{a_2b_2} = \overline{oa_1}/\overline{oa_2}$$

The following substitutions are made:

$$\overline{a_1b_1} = (T-Ton)/2$$

$$\overline{a_2b_2} = T/4$$

$$\overline{oa_1} = Pa - K(IC-If)$$

$$\overline{oa_2} = Pa$$

Arranging, we have $$T_{on}/T = 1 - \{Pa - K(Ic-If)\}/(2Pa) \quad (1)$$

The applied voltage of the motor is as follows:

$$\{Ton \cdot Vdc + Toff \cdot (-Vdc)\}/T = \{(2Ton/T) - 1\}Vdc \quad (2)$$

If the right side of Eq. (1) is inserted into Eq. (2) and the expression is arranged, the applied voltage of the motor will be $K \cdot Vdc(Ic-If)/Pa$. Accordingly, current loop gain K' becomes as follows:

$$K' = K \cdot Vdc/Pa \quad (3)$$

Therefore, since Pa is constant, the current loop gain K' will be rendered constant, irrespective of a fluctuation in the power supply voltage Vdc, by deciding the current loop constant K so as to be inversely proportional to the power supply voltage Vdc.

Figure 5:
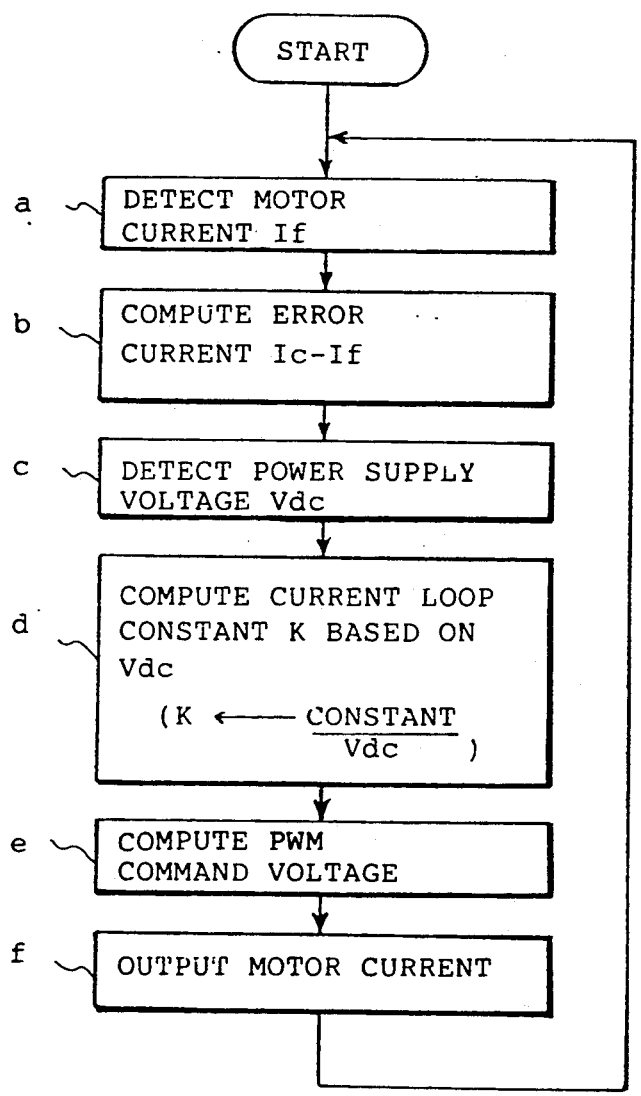
FIG. 5 is a flowchart illustrating a processing procedure for setting gain.

FIG. 5 is a flowchart illustrating a processing procedure for setting gain in the abovementioned motor current control loop.

The motor current (current feedback signal if) is sampled and detected as a digital value in a prescribed interval (step a). The error current Ic−If is calculated based on the value of the current feedback signal If (step b). At the same time, the power supply voltage Vdc supplied to the inverter section 2 is detected (step c). The current loop constant K is calculated using this detected power supply voltage Vdc (step d). The PWM control signal is calculated from the error current Ic−If and current loop constant K in such a manner that the current loop gain K' will be rendered constant (step e). The motor current is decided by the PWM control signal thus output, and velocity control is carried out (step f).

Though an embodiment of the present invention has been described, the invention it not limited thereto but can be modified in various ways without departing from the scope of the claims.

The velocity control apparatus of the present invention is capable of rendering current loop gain constant by setting a current loop constant that is inversely proportional to a fluctuation in power supply voltage. This makes possible stabilized velocity control of a servomotor.

We claim:

1. A velocity control apparatus for controlling drive current of a servomotor by a PWM-controlled inverter circuit, said PWM-controlled inverter circuit being operatively connected to a power supply, said velocity control apparatus comprising:
   voltage detecting means for detecting an output voltage value of the power supply;
   gain control means for holding constant a current loop gain based on the output voltage value detected by said voltage detecting means;
   means for receiving a command current value; and
   PWM-control means for PWM-controlling the PWM-controlled inverter circuit, said PWM-control means includes at least
       constant computing means for computing a current loop constant inversely proportional to the output voltage value of the power supply, and
       signal generating means for forming a PWM-control signal from the current loop constant and the command current value so that the current loop gain remains constant.

2. A velocity control apparatus as recited in claim 1, wherein said apparatus further comprises:
   a servomotor;
   command means for forming a current command a velocity command for the servomotor; and
   arithmetic means for computing a PWM command voltage based on a differential signal between the current command from said command means and a current feedback signal from the servomotor.

3. A velocity control apparatus as recited in claim 2, wherein said velocity control apparatus further comprises a control unit including at least
   means for executing computations of a constant in the PWM control means within one sampling period of the current feedback signal from the servomotor;
   means for executing computing the PWM command voltage; and
   means for deciding and outputting the drive current to the servomotor.

4. A method for controlling a motor current to a servomotor in accordance with a command current, said method comprising the steps of:
   (a) detecting an actual motor current of the servomotor;
   (b) calculating an error current as the difference between the command current and the actual motor current;
   (c) detecting a power supply voltage;
   (d) calculating a current loop constant to be inversely proportional to the power supply voltage;
   (e) calculating a PWM control signal based on the error current and the current loop constant; and
   (f) controlling the motor current in accordance with the PWM control signal.

5. A method as recited in claim 4, wherein a current loop gain is constant irrespective of changes to the power supply voltage.

6. A method as recited in claim 4, wherein said method further comprises step (g) controlling the servomotor in accordance with the motor current produced in step (e).

* * * * *

UNITED STATES PATENT AND TRADEMARK OFFICE
CERTIFICATE OF CORRECTION

PATENT NO. : 5,132,599
DATED     : July 21, 1992
INVENTOR(S) : Shinichi KONO et al.

It is certified that error appears in the above-identified patent and that said Letters Patent is hereby corrected as shown below:

Column 2, line 57, change "IF" to --If--.

Column 3, line 1, change "66 $oa_2b_2$" to --$\Delta oa_2b_2$--;
          line 14, change "(IC" to --(Ic--; and
          line 38, change "if)" to --If)--.

Column 4, line 23, after "command" (second occurrence), insert --and--.

Signed and Sealed this

Second Day of November, 1993

Attest:

Attesting Officer

BRUCE LEHMAN

Commissioner of Patents and Trademarks